United States Patent
Robison et al.

(10) Patent No.: US 12,441,854 B2
(45) Date of Patent: *Oct. 14, 2025

(54) HIGHLY FILLED CARBON NANOFIBER REINFORCED POLYSILOXANES

(71) Applicant: Honeywell Federal Manufacturing & Technologies, LLC, Kansas City, MO (US)

(72) Inventors: Thomas Wayne Robison, Kansas City, MO (US); Sabrina M. Torres, Kansas City, MO (US); Andrea Labouriau, Kansas City, MO (US)

(73) Assignee: Honeywell Federal Manufacturing & Technologies, LLC, Kansas City, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/465,614

(22) Filed: Sep. 12, 2023

(65) Prior Publication Data
US 2023/0416475 A1    Dec. 28, 2023

Related U.S. Application Data

(63) Continuation of application No. 16/052,217, filed on Aug. 1, 2018, now Pat. No. 11,787,912.
(Continued)

(51) Int. Cl.
*C08J 3/20*   (2006.01)
*C08G 77/12*   (2006.01)
(Continued)

(52) U.S. Cl.
CPC .............. *C08J 5/042* (2013.01); *C08G 77/12* (2013.01); *C08G 77/20* (2013.01); *C08J 3/20* (2013.01);
(Continued)

(58) Field of Classification Search
CPC .......... C08J 5/042; C08J 3/20; C08J 2383/04; C08G 77/12; C08G 77/20; C08K 3/02;
(Continued)

(56) References Cited

U.S. PATENT DOCUMENTS

| 4,176,093 A | 11/1979 | Zoch |
| 7,312,466 B2 | 12/2007 | Caldwell |

(Continued)

FOREIGN PATENT DOCUMENTS

| CN | 106189227 | 12/2016 |
| WO | 2015/051301 | 4/2015 |

OTHER PUBLICATIONS http://www.specmaterials.com/pdfs/boronneutronshielding.pdf; Boron Fiber Neutron Shielding Properties; Joseph W. Hanafin, William Grant, Specialty Materials, Inc. Lowell, MA; Leo Bobek, Thomas Regan, UMass Lowell, Radiation Laboratory, Lowell, MA; Jan. 10, 2011.
(Continued)

*Primary Examiner* — Matthew D Matzek
(74) *Attorney, Agent, or Firm* — HOVEY WILLIAMS LLP (57) ABSTRACT

Provided herein are polysiloxane-based composite materials comprising a high weight percentage of elemental components (e.g., elemental boron, elemental copper, elemental bismuth, elemental lead) and low levels of carbon nanofibers. The elemental components may be present in the composite materials at levels greater than 25% by weight. Also provided herein are methods of forming the composite materials that have desirable flexibility and shielding properties. The invention provides a versatile composite material that is compliant and moldable, while still comprising high levels of the elemental shielding components. The materials
(Continued)

are particularly useful for applications in which radiation shielding or neutron capture are desired.

20 Claims, 10 Drawing Sheets

Related U.S. Application Data (60) Provisional application No. 62/539,648, filed on Aug. 1, 2017.

(51) Int. Cl.
    *C08G 77/20*     (2006.01)
    *C08J 5/04*     (2006.01)
    *C08K 3/02*     (2006.01)
    *C08K 3/04*     (2006.01)
    *C08K 3/38*     (2006.01)
    *C08L 83/04*     (2006.01)
    *B82Y 30/00*     (2011.01)
    *B82Y 40/00*     (2011.01)
    *C08K 3/08*     (2006.01)

(52) U.S. Cl.
    CPC ............... *C08K 3/02* (2013.01); *C08K 3/04* (2013.01); *C08K 3/046* (2017.05); *C08K 3/38* (2013.01); *C08L 83/04* (2013.01); *B82Y 30/00* (2013.01); *B82Y 40/00* (2013.01); *C08J 2383/04* (2013.01); *C08K 2003/0837* (2013.01); *C08K 2003/085* (2013.01)

(58) Field of Classification Search
    CPC . C08K 3/04; C08K 3/046; C08K 3/38; C08K 2003/0837; C08K 2003/085; C08L 83/04; B82Y 30/00; B82Y 40/00
    USPC ............. 250/506.1, 515.1; 977/762; 428/367
    See application file for complete search history.

(56) References Cited

U.S. PATENT DOCUMENTS

| | | |
|---|---|---|
| 8,664,630 B1 | 3/2014 | Metzger et al. |
| 2002/0185614 A1 | 12/2002 | Joseph |
| 2004/0124374 A1 | 7/2004 | Joseph |
| 2012/0043483 A1 | 2/2012 | Bowen, III et al. |
| 2012/0241632 A1 | 9/2012 | Cordaro et al. |
| 2014/0225039 A1 | 8/2014 | Chiang et al. |
| 2015/0099078 A1 | 4/2015 | Fish |
| 2018/0040387 A1 | 2/2018 | Washington, II et al. |
| 2019/0092910 A1 | 3/2019 | Robison et al. |

OTHER PUBLICATIONS www.shieldwerx.com; Neutron Shielding; SWX-238 Flexi-Boron Shielding; Data Sheet Revision: Nov. 2015; A Division of Bladewerx LLC.

Office Action (Restriction) mailed Mar. 4, 2020 in corresponding U.S. Appl. No. 16/052,217, filed Aug. 1, 2018, 6 pages.

Office Action mailed Jun. 8, 2020 in corresponding U.S. Appl. No. 16/052,217, filed Aug. 1, 2018, 7 pages.

Office Action mailed Jan. 4, 2021 in corresponding U.S. Appl. No. 16/052,217, filed Aug. 1, 2018, 8 pages.

Office Action mailed Aug. 11, 2021 in corresponding U.S. Appl. No. 16/052,217, filed Aug. 1, 2018, 8 pages.

Office Action mailed Apr. 4, 2022 in corresponding U.S. Appl. No. 16/052,217, filed Aug. 1, 2018, 10 pages.

Office Action mailed Dec. 8, 2022 in corresponding U.S. Appl. No. 16/052,217, filed Aug. 1, 2018, 8 pages.

HIGHLY FILLED CARBON NANOFIBER REINFORCED POLYSILOXANES

CROSS-REFERENCE TO RELATED APPLICATIONS

The present application claims the priority benefits of U.S. Provisional Patent Application Ser. No. 62/539,648, filed Aug. 1, 2017, entitled BORON-FILLED SILOXANE POLYMERS FOR RADIATION SHIELDING, and is a continuation of U.S. patent application Ser. No. 16/052,217, filed Aug. 1, 2018, entitled HIGHLY FILLED CARBON NANOFIBER REINFORCED POLYSILOXANES, which are incorporated by reference in their entireties herein.

STATEMENT REGARDING FEDERALLY SPONSORED RESEARCH OR DEVELOPMENT

This invention was made with government support under Contract No. DE-NA0000622 and Contract No. DE-NA0002839, both awarded by the U.S. Department of Energy. The government has certain rights in the invention.

BACKGROUND OF THE INVENTION

Field of the Invention

The present invention is generally directed to polysiloxane-based composite materials comprising a high weight percentage of elemental components (e.g., elemental boron, elemental copper, elemental bismuth, elemental lead etc.) and carbon nanofibers. The materials are particularly useful for applications in which radiation shielding or neutron capture are desired.

Description of the Prior Art

Boron is used in many industries for many unique applications, including neutron shielding. However, to achieve many of the desired shielding properties, large loadings of boron are required. This often necessitates an extremely thick, low-density part or a very thin, high-density part, which is hard and brittle. Natural boron is unsuitable to be used as a structural component due to its inherent brittleness. The $^{10}$B isotope can also be used in biochemically targeted radiotherapy approaches. In the Boron Neutron Capture Therapy (BNCT), the alpha particles and lithium ions formed from the $^{10}$B (n, alpha) $^{7}$Li reaction, give rise to closely spaced ionizing events that kill cancerous cells while avoiding major damage to healthy ones. What is needed is a versatile composite material that is compliant and moldable, while still comprising high levels of boron and/or other elemental shielding components.

SUMMARY OF THE INVENTION

In one embodiment, the present invention is directed to a composite material. The composite material comprises polysiloxane polymer, carbon nanofibers, and greater than about 25% by weight of one or more elemental components.

In another embodiment, the present invention is directed to a method of producing a composite material. The method comprises forming a mixture comprising polysiloxane polymer, carbon nanofibers, and one or more elemental components, and curing the mixture to produce the composite material. The composite material comprises greater than about 25% by weight of the one or more elemental components.

In yet another embodiment, the present invention is directed to a composite material comprising from about 10% to about 75% by weight of one or more polysiloxane polymers, from about 25% to about 90% by weight of one or more elemental components, and from about 0.1% to about 10% by weight of carbon nanofibers. The composite material is substantially free of metal compounds and metalloid compounds other than the one or more polysiloxane polymers.

BRIEF DESCRIPTION OF THE DRAWINGS

Figure (FIG. 1 is an SEM image showing that carbon nanofibers are well-dispersed within the polymer matrix.

DETAILED DESCRIPTION OF THE PREFERRED EMBODIMENT

The present invention is generally directed to composite materials comprising (consisting of, or consisting essentially of) one or more polysiloxane polymers and one or more elemental components. As used herein, "elemental component" refers to a component material comprising an element that is not combined with other elements to form a compound. For example, the elemental component may comprise a single element in a monatomic, diatomic, or allotropic form in a zero-oxidation state. In certain embodiments, the composite material is substantially free of metal compounds and metalloid compounds other than the polysiloxane polymer(s). As used herein, "substantially free" means that the composite material comprises less than about 1% by weight of the compound. In certain embodiments, the one or more elemental components are present in the composite material at about 25% to about 90% by weight, preferably about 40% to about 75% by weight, and more preferably about 45% to about 60% by weight, with the total weight of the material taken as 100% by weight. In certain embodiments, the composite material comprises greater than about 25% by weight, greater than about 30% by weight, greater than about 35% by weight, greater than about 40% by weight, or greater than about 45% by weight of the one or more elemental components. In certain embodiments, the composite material comprises even higher loadings of the one or more elemental components, for example, greater than about 60% by weight, greater than about 75% by weight, and greater than about 85% by weight of the one or more elemental components. In certain embodiments, the one or more elemental components are selected from the group consisting of elemental boron, elemental copper, elemental bismuth, elemental lead, and combinations thereof. In certain embodiments, the one or more elemental components comprise a single elemental component. In certain embodiments, the composite materials further comprise carbon nanofibers. Therefore, in certain embodiments, the composite materials comprise (consist of, or consist essentially of) one or more polysiloxane polymers, one or more elemental components, and carbon nanofibers. The composite materials are particularly useful for applications in which radiation shielding and/or neutron capture are desired.

Polysiloxane polymers (also known as polysiloxanes or silicones) are polymers that comprise a chain of alternating silicon atoms and oxygen atoms, which can be combined with carbon and/or hydrogen. Polysiloxanes generally have the chemical formula $[R_2SiO]_n$, where R is an organic group, such as an alkyl (methyl, ethyl) or phenyl group. In certain embodiments, the one or more polysiloxane polymer comprise aromatic groups in the polymer backbone. In certain such embodiments, the one or more polysiloxane polymers comprise polydimethylsiloxane (PDMS). This copolymer advantageously exhibits good thermal and chemical stabilities, as well as chemical resistance to ionizing radiation due to the presence of aromatic groups in the siloxane backbone. In certain embodiments, the one or more polysiloxane polymers are present in the material at about 10% to about 75% by weight, preferably about 25% to about 60% by weight, and more preferably about 40% to about 50% by weight, with the total weight of the material taken as 100% by weight.

In certain embodiments, the one or more elemental components comprise elemental boron. Elemental boron has two naturally occurring and stable isotopes, $^{11}B$ and $^{10}B$. The $^{10}B$ isotope generally exhibits radiation shielding and neutron capture properties. In one or more embodiments, boron is present in the composite materials as enriched $^{10}B$ boron filler. Particularly, in certain embodiments, the boron content comprises greater than about 50% $^{10}B$, preferably greater than about 75% $^{10}B$, and more preferably greater than about 90% $^{10}B$, and most preferably greater than about 99% $^{10}B$, with the total boron content of the composite material taken as 100% by weight. In certain embodiments, elemental boron is present in the material at about 25% to about 75% by weight, preferably about 40% to about 60% by weight, and more preferably about 45% to about 55% by weight, with the total weight of the material taken as 100% by weight. In certain embodiments, the composite material comprises greater than about 25% by weight, greater than about 30% by weight, greater than about 35% by weight, greater than about 40% by weight, or greater than about 45% by weight of elemental boron. In certain embodiments, the composite material is substantially free of boron compounds (e.g., boric acid, borate, borax, boron oxide, boron nitride, etc.).

The one or more elemental components may comprise other components imparting similar or different properties as elemental boron into the composite materials. In certain embodiments, the one or more elemental components comprise elemental copper, elemental bismuth, and/or elemental lead. These particular components impart shielding properties into the composite material. In certain embodiments, elemental copper and/or elemental bismuth are present in the material at about 25% to about 90% by weight, preferably about 40% to about 75% by weight, and more preferably about 45% to about 60% by weight, with the total weight of the material taken as 100% by weight. In certain embodiments, the composite material is substantially free of copper compounds, bismuth compounds, and/or lead compounds.

In certain embodiments, the composite materials comprise carbon nanofibers. Carbon nanofibers are cylindric nanostructures with graphene layers arranged as stacked cones, cups, plates, or cylinders (nanotubes). In one or more embodiments, the carbon nanofibers are dispersed within the polysiloxane resin. The well-dispersed nanofibers lead to an "interface dominated" material with improved mechanical properties even at very high filler loadings. In certain embodiments, the carbon nanofibers are present in the material at about 0.1% to about 10% by weight, preferably about 1% to about 5% by weight, and more preferably about 2% to about 4% by weight, with the total weight of the material taken as 100% by weight.

Additional additive components may also be included as needed or desired. However, in certain embodiments, the composite material consists essentially of (or consists of) a polysiloxane polymer and one or more elemental components. In other embodiments, the composite material consists essentially of (or consists of) one or more polysiloxane polymers, one or more elemental components, and carbon nanofibers.

Methods of forming the composite materials comprise mixing the one or more polysiloxane polymers, one or more elemental components, and carbon nanofibers to form a composite material comprising the polysiloxane polymer resin(s) with the elemental components and carbon nanofibers dispersed therein. The mixture may be prepared by adding a solid powder form of the one or more elemental components to the polysiloxane polymer. In certain preferred embodiments, the mixture is formed by separately adding the carbon nanofibers and the one or more elemental components to the polysiloxane polymer. The polysiloxane polymer(s) may be synthesized, for example, by mixing and/or crosslinking two polymers to form the polysiloxane polymer or copolymer resin. In certain embodiments, vinyl terminated dimethylsiloxane copolymer is mixed with polymethyl-hydrosiloxane to form the polydimethylsiloxane. In certain such embodiments, the vinyl terminated dimethylsiloxane copolymer and poly-methyl-hydrosiloxane are mixed at a ratio of about 2:1 to about 99:1, preferably about 5:1 to about 50:1, and more preferably about 8:1 to about 20:1 vinyl terminated dimethylsiloxane copolymer to poly-methyl-hydrosiloxane. Aromatic substitution in the polymer backbone provides remarkable protection against radiolysis with tolerance to ionizing radiation, increasing almost exponentially with increasing phenyl concentration. Regardless the polysiloxane polymer or polymer precursors provided, the carbon nanofibers and elemental component(s) are then mixed and dispersed therein. Any additive components can be mixed added at this point. The resin is then cured to form the composite material. In particularly preferred embodiments, the components are mixed as described above and cured by heating to a temperature of at least about 105° C. using 0.10 g of platinum cyclovinylmethylsiloxane complex.

The composite materials described herein have a number of advantages over prior art materials, which allows the materials to be used for a number of applications. The polysiloxane polymer is reinforced with carbon nanofiber, in contrast to the silica reinforced polymers of the prior art. This provides for structural reinforcement of the materials, while still allowing for inclusion of the needed levels of boron (or other component) for effective shielding and for production of a flexible and thin part that is ideal for many applications. The material is flexible and compliant at high loading levels (e.g., high boron loading levels) and displays good mechanical properties at high concentrations (e.g., high boron concentrations). Furthermore, in particularly preferred embodiments, good resistance to ionizing radiation and effective capture of thermal neutrons is accomplished by the use of a cross-linked copolymer with high concentrations of both aromatic groups in the polymer backbone and isotopically enriched B-10 in the polymer matrix. Advantageously, the composite materials described herein are easily moldable, even at high weight percent boron levels (or other elemental component levels). Unlike prior art materials, the composite material possesses a low volatile content, which reduces offgassing. Additionally, the ability of polysiloxanes (silicones) to provide certain compliance properties when cured offer advantages over current matrix materials. The material is customizable to obtain a wide range of densities and mechanical properties and exhibits high stability in the presence of neutron exposure.

Composite materials in accordance with embodiments of the present invention can be used for a variety of applications. Due to its large neutron cross-section, the $^{10}$B isotope is an efficient shielding material for neutron and cosmic radiation. The composite materials are particularly useful for applications where neutron shielding or neutron capture is desired in a material that must be compliant and moldable. For example, the composite materials according to certain embodiments of the present invention can be used for shielding in nuclear power plants, for personal protection equipment, and for cosmic radiation protection. Specific applications for the composite materials comprising the isotope may include shielding of neutron spectra in and around nuclear reactors and in spent fuel pools. Space radiation shielding for long duration space flight could be one of the many applications for the composite materials comprising this isotope.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth the synthesis and testing of a composite material prepared according to embodiments of the present invention. It is to be understood, however, that these examples are provided by way of illustration and nothing therein should be taken as a limitation upon the overall scope of the invention.

Example I

1. Introduction

In this example, a highly boron-filled polysiloxane-based material was formulated that also contains small amounts of carbon nanofibers, which enhanced its mechanical strength. This material was subjected to very high neutron fluences within very short time periods to evaluate its radiological tolerance. These transient neutron environments were provided by the Annular Core Research Reactor (ACRR), which is based at Sandia National Laboratories (Albuquerque, New Mexico). Radiation-induced changes in chemistry, thermal properties, microstructure, and mechanical response were assessed by a combination of diverse experimental techniques, which provided valuable insights on the tolerance of this new composite to harsh radiation environments.

Figure 1:
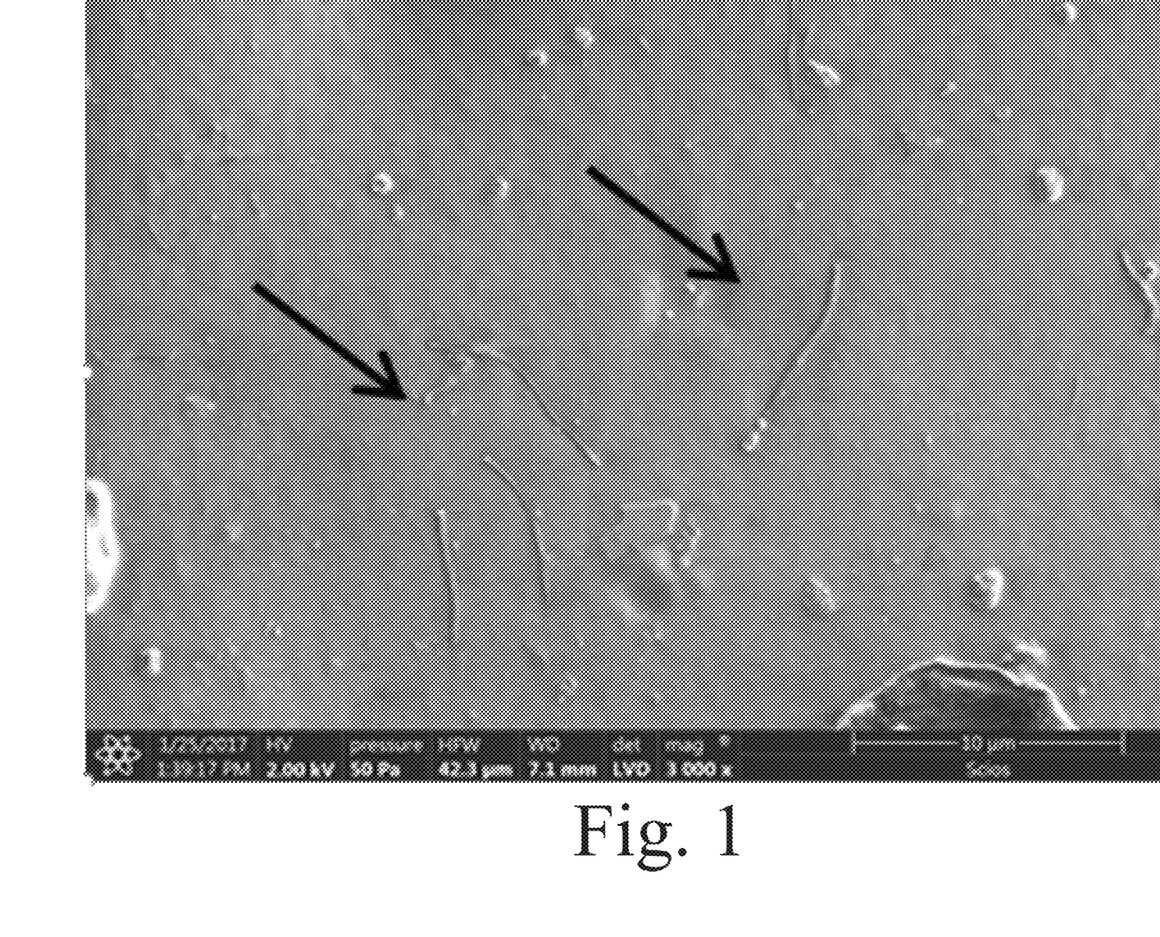

2. Materials, Experimental Set Up and Characterization Techniques 2.1. Material Synthesis The polydimethylsiloxane (PDMS)-based composite was synthesized using 89.73 g vinyl terminated dimethylsiloxane copolymer (Gelest PDV 0535, $M_w$=47,500; % phenyl is 4-6%), mixed with 7.27 g poly-methyl-hydrosiloxane (Gelest HMS 151, $M_w$=1,900 to 2,000; mole ratio of MeSiHO is 15-18). The organic filler used was carbon nanofibers (3.0 g of Pyrograff PR-19-XT-PS), whereas the inorganic filler was 100 g of isotopically enriched $^{10}$B (99.80% purity and a B10/B11 ratio of 12:1 or 92.3% B10). SEM images shown in FIG. 1 illustrates that the fibers were well-dispersed into the polymer matrix. The resin was cured at 105° C. using 0.10 g of platinum cyclovinylmethylsiloxane complex (Gelest SIP6832.2).

2.2. Experimental Set Up

The samples were exposed to various neutron/gamma fluxes at the Annular Core Research Reactor (ACRR) at Sandia National Labs with the goal of evaluating their radiological tolerance. The ACRR is a water-moderated, pool-type research reactor capable of steady-state, pulsed and tailored transient operations. It has a dry, 9-inch diameter cavity in the core's center and a 20-inch diameter external cavity. The polymer samples were located in the center cavity of the reactor and were exposed to short pulses with energies varying from about 50 to 120 MJ. Samples were cut into 1" diameter and were secured in place by stapling on the outside of cardboard tubes. The height of the cardboard tube was such as to expose the samples to well-controlled conditions inside the center cavity. Thermocouples were mounted on the surface of a certain number of samples, and the temperature profile was monitored using a CADET data acquisition system. Type K thermocouples used in this work were certificated and calibrated from 0 to 300° C. Sulfur dosimetry and TLDs were fielded as passive dosimeters and used to determine neutron fluences and gamma doses.

Pre-test models were created using Abaqus CAE and MCNP6 to determine the neutron-gamma dose in the polymer discs and estimate the temperature change during reactor exposures. These models guided the test assembly layout, with regard to height and radial placement of discs in the central cavity. Discs were fielded high in the cavity to allow for high energy pulses while not exceeding the PDMS thermal degradation. MCNP dose profiles showed the outer edges and surfaces to absorb much larger dose than the internal regions of the discs, due to thermal neutron absorption on the outer surfaces. Thermocouple transducers were fielded at different regions of the discs to capture this gradient. The thermal response of the polymers was calculated through a radiation dose and heat capacity correlation to arrive at degrees per neutron. That value was then scaled to degrees per-reactor-MJ, based on the average number of neutrons per fission and energy yield per fission, and then linearly extrapolated to various (MJ) pulse intensities. The modeling predictions did not account for conductive heat transfer within the polymer and into the assembly mounts.

2.3. Thermal Analyses

TGA experiments were carried out using a commercial TA Instruments Q5000. 10 to 20 mg samples were heated from 30° C. to 750° C. at 2° C./min under nitrogen atmosphere. DSC experiments were performed on a TA Instruments Q2000 DSC with a liquid nitrogen cooling (LNC) accessory. Approximately 5 to 10 mg sample were sealed in a Tzero aluminum hermetic pan. The cooling-heating cycle consisted of equilibrating the sample to 35° C., cool down to −20° C. at 10° C./min, cool down to −150° C. at 5° C./min, isotherm at −150° C. for 15 minutes, heat up to 100° C. at 10° C./min. Both the temperature and heat of fusion were calibrated using the melting of high purity Indium. The pristine polymer was characterized by a melting temperature ca. −44.5° C. and a glass transition temperature at about −120° C., which are typical for siloxanes.

2.4. Chemical Characterization

IR absorption spectra were obtained with a Nicolet Avatar 360 benchtop FTIR operating in Attenuated Total Reflectance (ATR) mode. Data was collected using a Smart DuraSamplelR ATR accessory equipped with a diamond crystal. The IR detector was deuterated tri-glycine sulfate (DTGS). All data was taken with a resolution of 8 cm$^{-1}$, and represent the average of 32 scans. Extractable material was obtained by immersing 1.93 g sample in 3.1 g of deuterated chloroform overnight (99.6% deuterated from Acros Organics). Extracts were analyzed by liquid-state $^1$H NMR experiments using a Bruker Avance NMR spectrometer operating at 500.13 MHz; proton signals were referenced to the residual protons from the solvent.

2.5. Solvent Swelling

Experiments were performed to estimate changes in cross-link density/chain scission as a result of radiation exposure. Three specimens for each condition were analyzed by this method. The samples (about 1.93 g) were first weighed for the initial dry weight and then immersed in toluene (Fisher Scientific, 99% purity). Swollen samples were periodically weighed during two weeks when saturation was reached. Equilibrium weights were recorded at the end of the experiment. The samples remained whole during and after solvent uptake. Dry weights after solvent swelling were about 2% lower than initial dry weights with the solvent remaining visibly clear.

2.6. Sem Imaging

A FEI Scios Low Vacuum Dual Beam field emitter SEM was used to characterize flat surface and cross-sectioned views of pristine and irradiated samples. The samples were sprayed with dry nitrogen to remove loose particles from the surface. Ted Pella conductive silver paint was used to keep the samples in place during examination. Images for the flat surface and cross-sectioned views were taken at 350×, 1000× and 3500× with respect to the SEM monitor display for characterization of material, imaging voltages ranged between 2 kV and 5 kV. The Scios Low Vacuum imaging detector (LVD) was used in a whole chamber pressure range of 10 to 50 pascals.

2.7. Mechanical Testing

Each of the irradiated pads was subjected to cyclic compression test in order to identify how each level of dose affected the mechanical properties. Sample dimensions were approximately 22.94 mm diameter, and 3.53 mm height, and an average density of 1.33 g/cc. The samples were tested at room temperature at a load rate of 0.03576 mm/s to ~30% engineering strain. The compression tests were conducted with an MTS model 880 test frame with a second 100 lb load cell and an extensometer to control and measure displacement more accurately. The extensometer used adds a small additional load due to the spring constant of the device, but it can be measured and subtracted from the experimental data if it is a high enough percentage of the overall load signal. Generally, the load increase is about 0.75 N/0.5 mm of displacement, and it is linear over its range of accuracy (0.5" displacement range). This bias load was determined to be less than 3% of sample load for the pads. The analysis of the current results does not subtract away this known bias error since this error is consistent for all tests. The benefit to using this extensometer is that it eliminates system compliance and hysteresis that can be seen in the LDVT signal, thus reducing the uncertainty of the load/displacement for the entire system. The experiments were run by placing the samples on optically flat tungsten carbide platens, centered in the loading system, with no lubrication. The tests were run by finding the contact of the platens and setting that as zero displacement, opening to a gap large enough to insert the samples, bring them into near contact with the sample to increase the thermal conductivity into the material. Then run to a gap that is approximately 60% engineering strain. This enables one to determine contact during each test, make sure the sample is fully unloaded between cycles and ensure no pre-strain is put on the sample during set up.

3. Results and Discussion

Newly formulated polymeric composites were characterized for radiation susceptibility after being exposed in a pool-type reactor configured as a reference field commonly used for radiation damage studies. The total energy deposited in polymers exposed to reactor radiation is dependent on the influence of several interactions, with gamma rays and the scattering of fast neutrons being typically the main contributors. In one of the first investigations on the effects of reactor radiation on hydrocarbon and fluorocarbon polymers, the authors demonstrated that the deposited energy depends strongly on the polymer hydrogen density due to the high $^1$H neutron scattering cross section. A good example is polyethylene, which absorbs a large amount of energy from neutrons because it has high proton density. Furthermore, the efficiency of each type of radiation is generally related to the linear energy transfer (LET, equivalent to the stopping power), which describes the rate at which energy is deposited in matter per unit distance. Essentially, LET effects in polymers provide an indication of the reaction mechanisms involved, as well as a basis for the prediction of property changes in a radiation field. Over the years, the effects of different kinds of ionizing radiations and LETs on the radiolysis of polymers have been the subject of numerous studies. In particular, one work provided a comprehensive review of the LET effect on the generation of molecular hydrogen, a common product formed from the radiolysis of hydrocarbon polymers. That review involved comparing polymers irradiated by $^{60}$C.o γ-rays (LET ca. 0.2 eV/nm), with polymers irradiated using heavy ions with energies ranging from 5 to 30 MeV, and LET values up to 800 eV/nm for 10 MeV carbon ions. It was found that, for high-density polyethylene, isotactic polypropylene, poly(methyl methacrylate), and polystyrene, hydrogen yields generally increased with increasing LET. In addition, hydrogen yields of polymers exposed to very high-energy ion-beams tended to approach those generated by γ-rays. Comparable effects were observed when poly(di-n-hexylsilane) (PDHS) was irradiated using a variety of high-energy ion beams, electron beams, and $^{60}$C.o γ-rays, with LET values ranging from 0.2 to 1620 eV/nm. Changes in the PDHS molecular weight indicated that the number of cross-links per absorbed 100 eV or G(X) increased from 0.042 to 0.91 with increasing LET values. Furthermore, another study showed that the cross-linking rate of polystyrene specimens irradiated in γ-sources and in a nuclear reactor was two- to threefold higher for the reactor exposure (G(X)=0.096 for fast neutrons, LET ca. 30 eV/nm and G(X)=0.034 for $^{60}$C.o γ-rays). The authors proposed that increased yields of cross-links at high LET could be accounted for by enhancement of second-order processes in overlapping spurs rather than competing first-order reactions.

Ionizing effects are thus expected to become more pronounced if radiation of high LET is used. The polymeric material synthesized herein was subjected not only to gamma rays and fast neutrons generated by the nuclear reactor, but also to alpha radiation originated from the boron filler itself. The boron filler used here is isotopically enriched with $^{10}$B having large cross-section (3840 barns). The nuclear capture and fission reactions that occur when non-radioactive $^{10}$B is exposed to thermal neutrons yield alpha particles and recoiling $^7$Li nuclei. Typically, these charged secondary particles have very high LET values, and as a result deliver a large dose in a very small volume. There are few published studies concerning the effect of this type of radiation on the degradation of polymers. One of such studies compared radiation effects of alpha particles (generated from $^{10}$B(n,α) $^7$Li, LET ca. 280 eV/nm) to γ-rays (LET ca. 0.2 eV/nm) on boric acid/polystyrene mixtures. The authors measured G(X) values of the mixture to be equal to 0.15 for the alpha exposure, but only 0.018 for the γ-ray exposure.

The environment in which the polymer is irradiated can also influence radiation chemistry mechanisms like chain scission, cross-linking, and oxidation. Irradiation induced-radicals often tend to react to form cross-links when polymers are irradiated under inert atmosphere. Increasing in cross-link density can induce significant changes in mechanical properties, such as increase in elastic modulus and hardness accompanied by reduction in elongation. On the other hand, the nature of the chemical reactions is altered when polymers are irradiated under reactive atmosphere like air, which was the case in this experiment. In other words, oxygen tends to react with free radicals and initiate oxidative degradation processes that can cause material hardening via oxidative cross-linking in parallel with scission reactions. The presence of oxygen in the polymer or in the atmosphere may lead to formation of stable peroxides or hydroperoxides, which are likely to compete with cross-link reactions. Generally, the presence of oxygen often increases the amount and/or rate of oxidative degradation of the polymer. The balance between cross-linking and chain scission reactions, both under inert or oxidative conditions is generally material specific and hence of interest in polymer radiation chemistry studies.

The radiation produced in the ACRR involves gamma rays and neutrons with energies ranging from thermal to ~3 MeV energies. A detailed description of this research reactor can be found in earlier publications. In the ACRR experiments performed herein, the temperature of the sample was measured in-situ, and it was found to increase in a non-linear fashion with increasing radiation exposure. It is worth mentioning that the temperature was somewhat dependent on how well the thermocouple was embedded into the sample, and may thus have contributed to produce small variations in the reading temperature. In-situ temperatures were also simulated in pre-test models using Abaqus and MCNP calculations using the radiation dose and heat capacity correlation to provide degrees-per-reactor-MJ. This approach relies on the estimated number of neutrons emitted from a measured reactor yield (MJ), rather than a more precise method that employs passive dosimetry foils to measure actual neutron population, which can be applied in post-test modeling. Estimated pre-test temperature values agree relatively well with experimentally-measured temperatures, as shown in Table 1.

TABLE 1

Gamma doses, neutron fluences and pulse energies applied to the filled polymers, sample temperatures (observed and estimated) and molecular weights between cross-links obtained from solvent-swelling experiments.

| Gamma Dose (kGy) | Neutron Fluence 1 Mev (Si) | Neutron Fluence >3MeV | Pulse (MJ) | Peak Temp (° C.) | Simulated Temp (° C.) | $10^4 M_c$ g/mol |
|---|---|---|---|---|---|---|
| 4.00 | 4.01e+14 | 5.22e+13 | 47.07 | 88 | 82 | 5.1 |
| 5.33 | 4.90e+14 | 6.29e+13 | 59.56 | 114 | 104 | 4.9 |
| 5.74 | 6.11e+14 | 7.87e+13 | 73.22 | 122 | 128 | 4.8 |

TABLE 1-continued

Gamma doses, neutron fluences and pulse energies applied to the filled polymers, sample temperatures (observed and estimated) and molecular weights between cross-links obtained from solvent-swelling experiments.

| Gamma Dose (kGy) | Neutron Fluence 1 Mev (Si) | Neutron Fluence >3MeV | Pulse (MJ) | Peak Temp (° C.) | Simulated Temp (° C.) | $10^4 M_c$ g/mol |
|---|---|---|---|---|---|---|
| 7.18 | 8.26e+14 | 1.022e+14 | 99.25 | 151 | 174 | 4.7 |
| 8.13 | 1.00e+15 | 1.301e+14 | 122.62 | 155 | 214 | 4.3 |

Radiation induced cross-linking and chain scission reactions were evaluated by the solvent-swelling experiment, which is one of the preferred methods to gauge variations in the polymer network due to its easiness to perform. The experiments performed herein showed a slight decreasing in the swelling behavior of the irradiated samples (the pristine sample swelled 340% whereas the sample exposed to the 122.62 MJ exposure swelled to 312%). The equilibrium weights obtained in toluene were then applied to the Flory-Higgins model to estimate the average molecular weight between cross-links ($M_c$) for the polymer-filler composite:

$$M_c = \frac{\rho_e (v_f^{1/3} - v_f/2) v_1}{\ln(1 - v_f) + v_f + \chi v_f^2} \qquad \text{eq. (1)}$$

where $\rho_e$ is the density of the rubber, $v_1$=106.5 is the molar volume of toluene, of is the volume fraction of polymer in the sample at equilibrium swelling, and $\chi$=0.451 is the polymer-solvent interaction parameter. Molecular weights between cross-links are listed in Table 1 and suggest a small increasing in cross-link density (which is inversely proportional to $M_c$) with increasing radiation dose.

Figure 2:
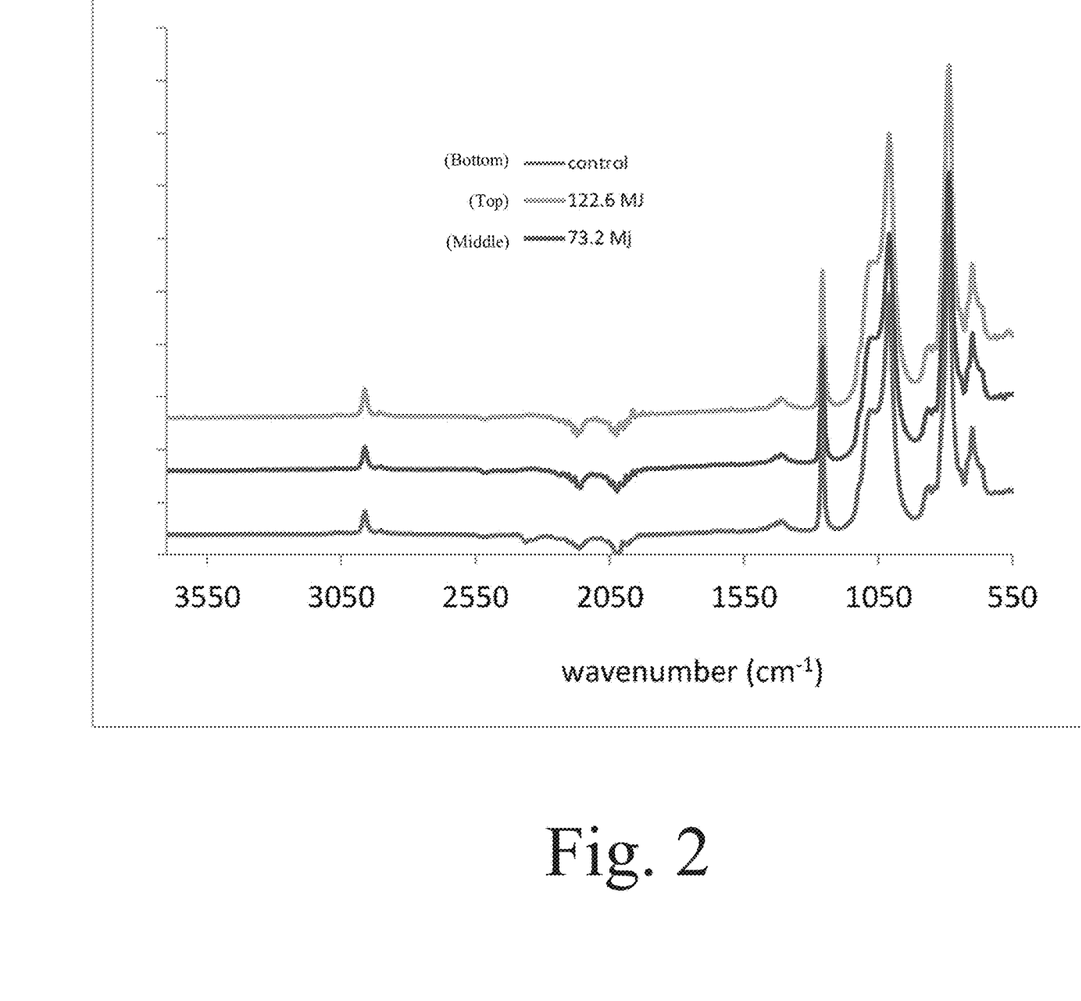
FIG. 2 is a graph showing FT-IR absorbance spectra for samples exposed to 122 MJ (top trace), 73 MJ (middle trace), and control sample (bottom trace)

The irradiated polymers were analyzed using FTIR spectroscopy with results shown in FIG. 2. Spectra are representative of silicone elastomers in general. Numerous investigators have observed that, for a wide range of experimental conditions and dose rates, abstraction of H and $CH_3$ radicals take place when PDMS is exposed to ionizing radiation. This leads to the evolution of hydrogen, methane and ethane. In addition to these gases, carbon dioxide and carbon monoxide are typically detected when the polymer is exposed to radiation in air. Abstraction of H or $CH_3$ radicals will result in a decrease in intensity of the band at ca. 2964 $cm^{-1}$, which corresponds to the C—H stretching in $CH_3$. Another expected effect of radiolysis would be a decrease in intensity of the ca. 1261 and 799 $cm^{-1}$ bands ($CH_3$ symmetrical bending and $CH_3$ rocking, in Si—$CH_3$). Finally, an increase in cross-link density has been associated with changes in the broad band at ca. 1092 $cm^{-1}$ and 1020 $cm^{-1}$, which are related to asymmetric and symmetrical stretching of Si—O—Si; respectively. The FTIR spectra of irradiated samples showed no significant chemical changes, indicating minor damage associated to the radiation field produced by the reactor.

Figure 3:
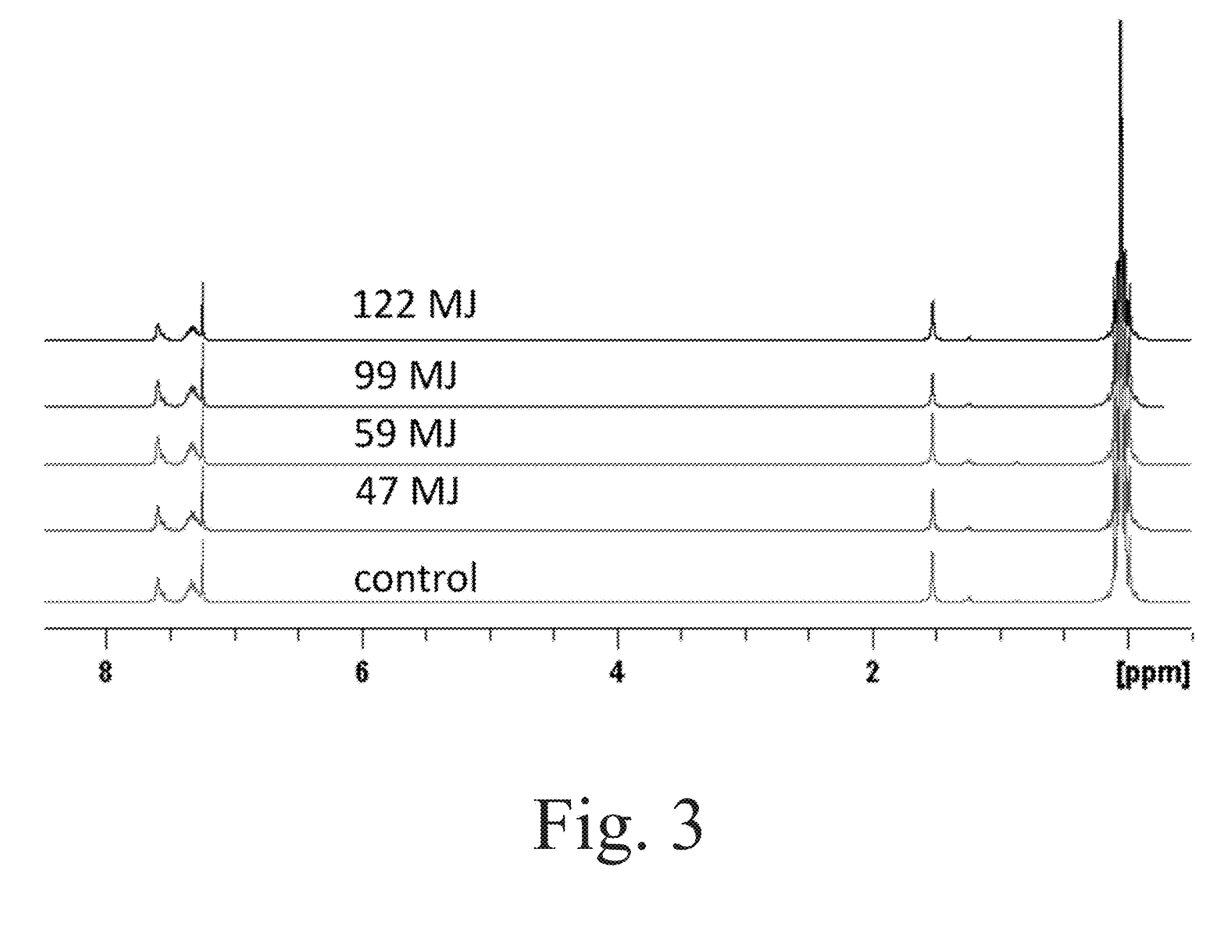
FIG. 3 is a graph showing $^1$H NMR spectra of extracts obtained from samples exposed to 122 MJ, 99 MJ, 59 MJ, 47 MJ, and control sample, with residual protons from the solvent showing up at 7.25 ppm, and from water at 1.56 ppm.

NMR spectroscopy was used to probe changes in the material's chemistry as well. Extracted material was obtained from the copolymer with the objective to isolate and detect low molecular weight fragments resulting from potential chain scission reactions and oxidative degradation. Extracts were analyzed by liquid-state $^1H$ NMR spectroscopy and were found to be composed mainly of a large peak corresponding to methyl groups from PDMS chains, and small peaks associated with aromatic protons from 7.2 to 7.6 ppm. See FIG. 3. Quantitative analysis of the extracts showed no significant changes in their concentration with radiation exposure. No additional fragments were detected that could be associated with chain scission reactions in agreement with cross-link formation being the predominant effect of reactor radiation.

Figure 4:
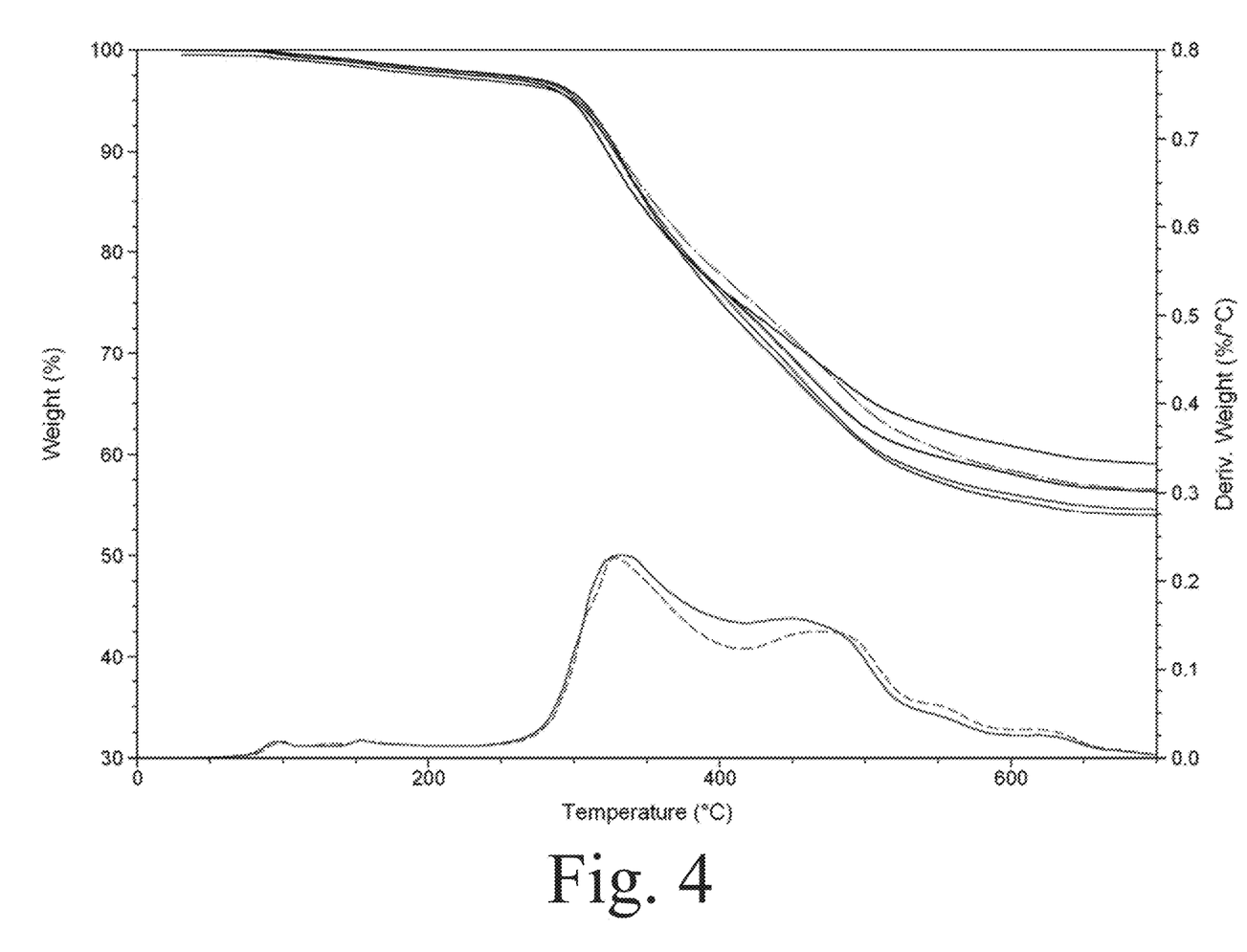
FIG. 4 is a graph of TGA results showing AM pads undergoing mass loss during a constant ramp in temperature, with the derivative weight (%/° C.) also illustrated, and the control indicated by dashed trace.

The thermal stability of the irradiated samples was probed by TGA experiments with the evolving weight % shown in FIG. 4. For all samples, there were low and high temperature distinct regions of mass losses, which can be identified by studying peak locations in the DW % data. Small mass losses at 100° C. and 152° C. can be associated with physi-sorbed water and evaporation of low-molecular weight compounds. More significant mass losses occur at around 270° C. and max out at 340° C. with 25% mass loss. The second high temperature mass loss maxes out at 480° C. Both high temperature losses are likely attributed to depolymerization of the polymer backbone with evolution of cyclic oligomers, with the trimer being the most abundant product of the thermal degradation of PDMS in an inert atmosphere or under vacuum. Furthermore, the degradation rate and residual mass can vary over a large range depending on factors such as impurities, water, fillers, and residual catalyst. The degradation rate was very similar for irradiated and control samples, suggesting no significant changes in the thermal stability with reactor radiation. In case a significant increasing in cross-linking density was to take place, decreasing of the thermal degradation rate should occur as a result of decreasing in chain mobility. Once thermal degradation ended, there was a small variation in the residual solid mass, which we attributed to sample to sample variations.

Figure 5:
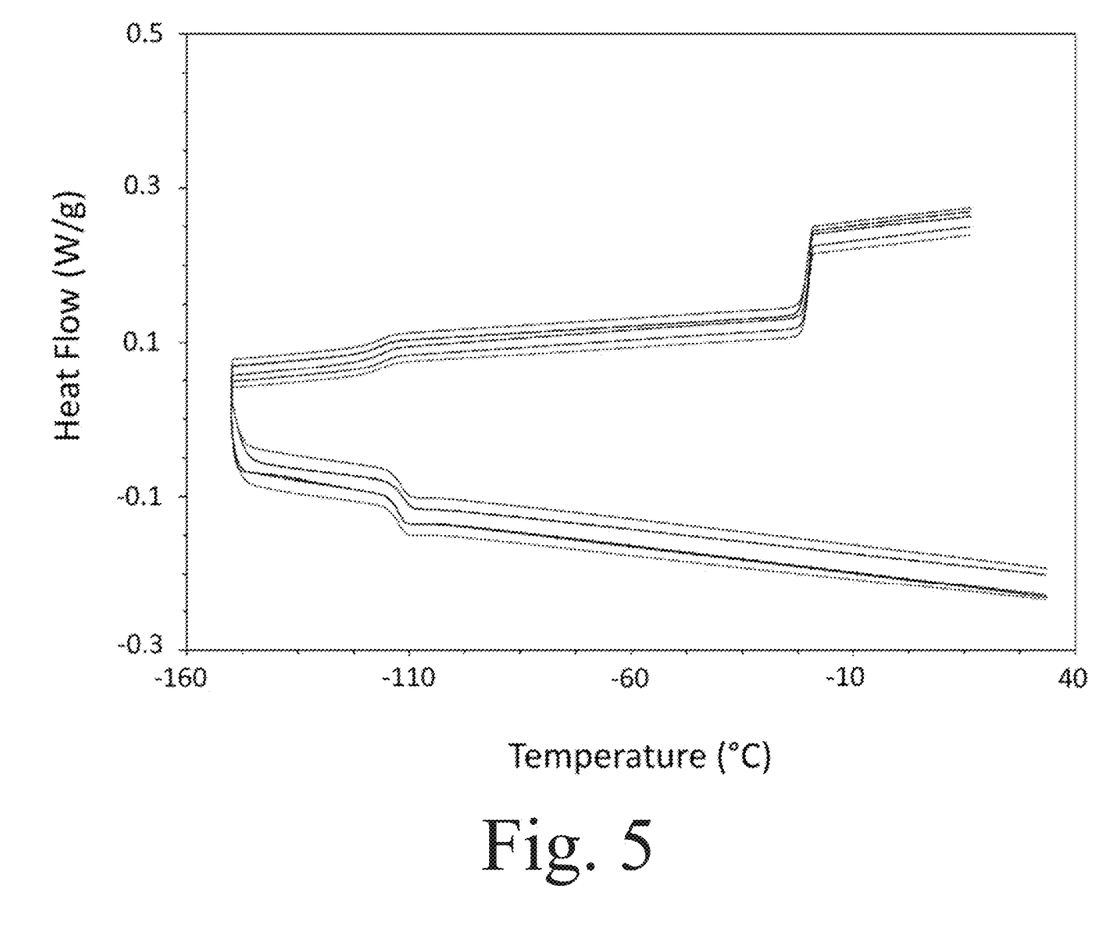
FIG. 5 is a graph showing DSC thermograms with cooling and heating cycles obtained for samples exposed to 122 MJ (top trace), 99 MJ (second trace), 59 MJ (third trace), 47 MJ (fourth trace), and the control sample (bottom trace)
Figure 6A:
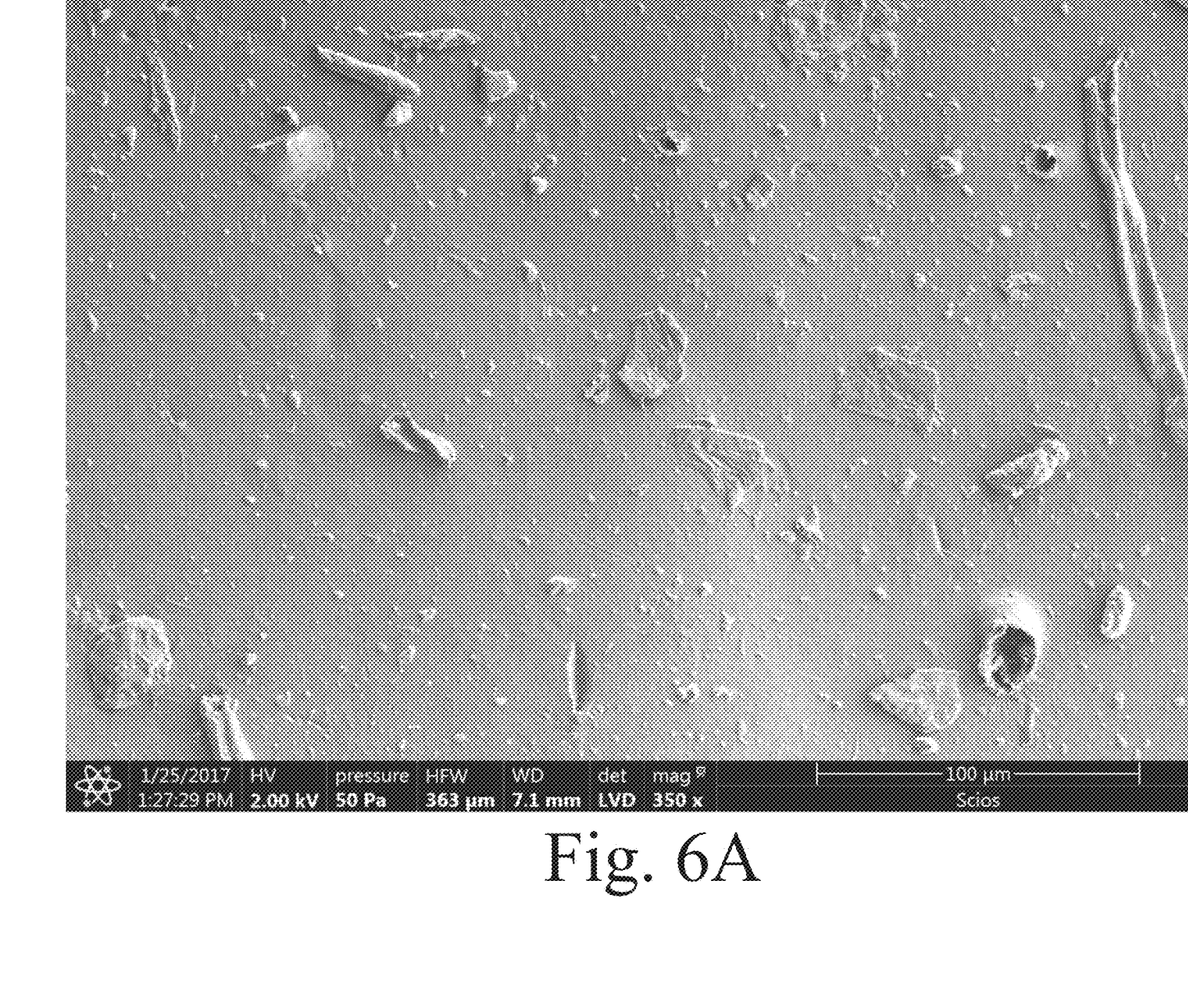
FIGS. 6A and 6B are surface SEM images for pristine (FIG. 6A) and 122 MJ (FIG. 6B) samples.
Figure 6B:
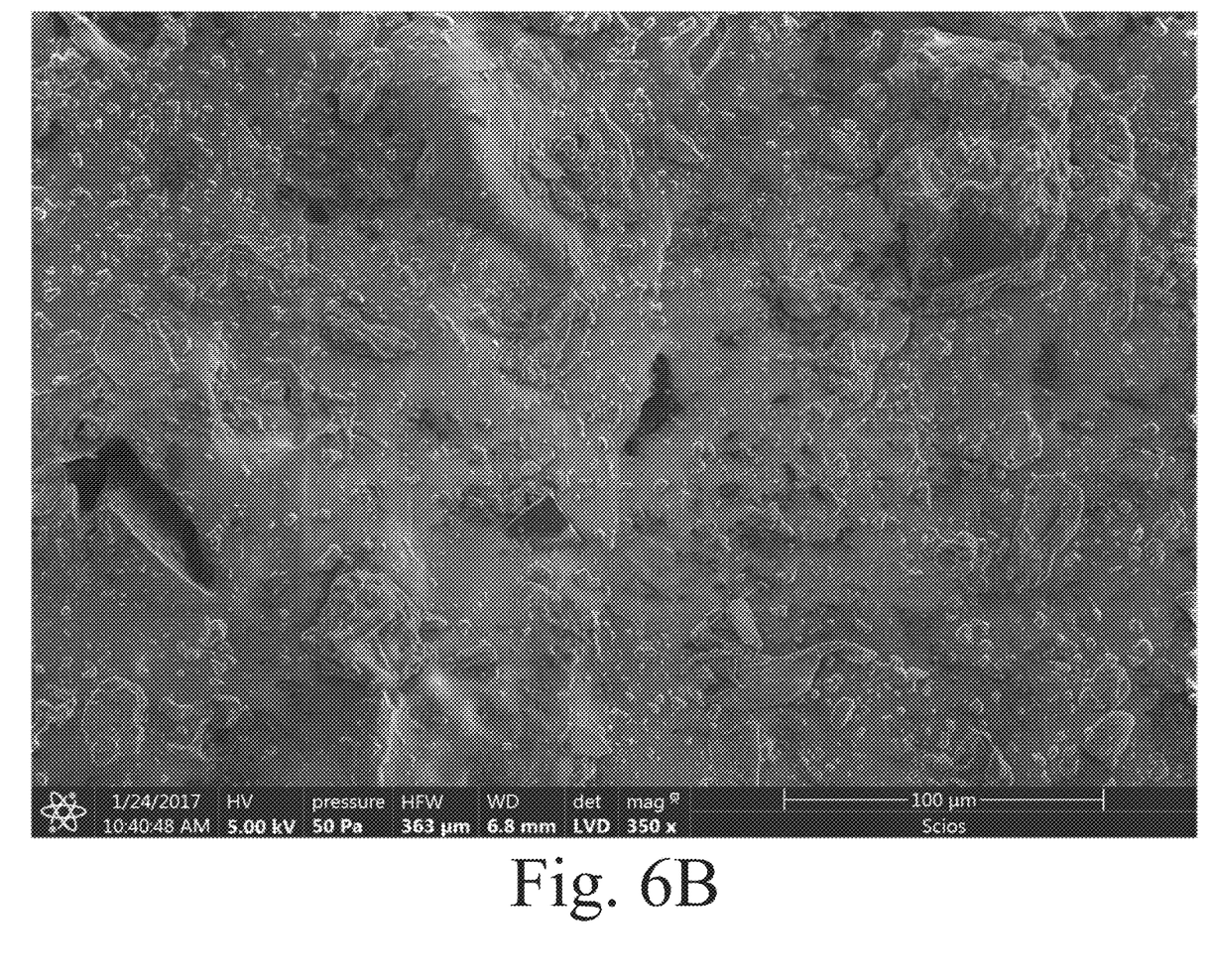
Figure 7A:
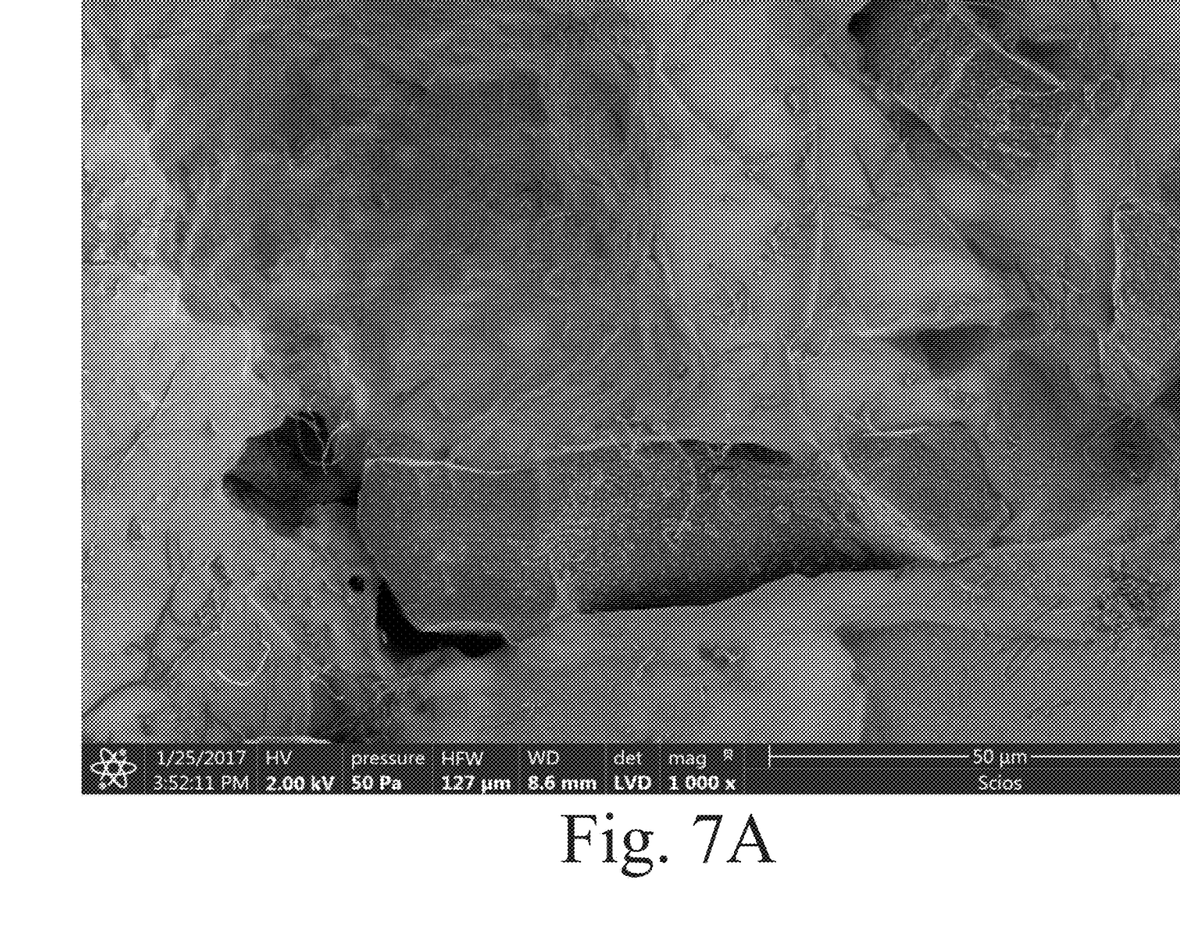
FIGS. 7A and 7B are cross-sections SEM images for pristine (FIG. 7A) and 122 MJ (FIG. 7B) samples.
Figure 7B:
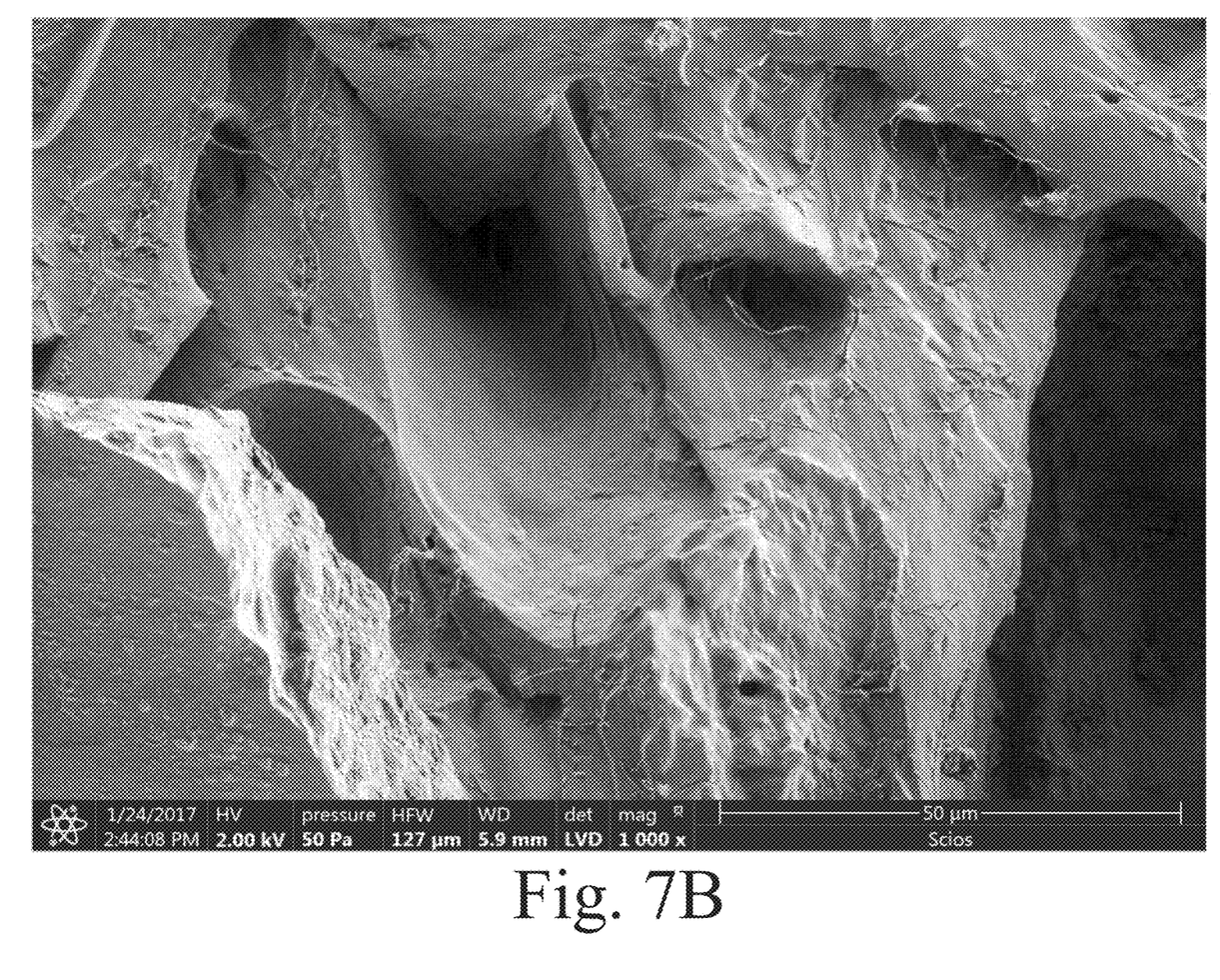

Exposure of polymers to ionizing radiation may change the degree of crystallinity and shift the glass transition temperature ($T_g$). DSC, a calorimetry method that measures heat flow as a function of temperature, was applied to investigate these effects with results shown in FIG. 5. DSC thermograms of pristine or irradiated samples exhibited no exothermic peak either in the cooling cycle or an endotherm peak in the heating cycle. The absence of crystallization phenomenon is likely due to the high concentration of phenyl groups that essentially prevent chain conformational mobility limiting the reconfiguration of the chains into a crystalline state. Thus, the low temperature mechanical response of the synthesized material, such as modulus, yield stress, and creep, will not be affected by radiation induced changes in crystallinity levels. The T g for irradiated and control samples is observed at about −112° C., whereas for PDMS is −123° C. It has been shown that for random copolymers, Tg is related to the mole percent of diphenyl groups (x) by the following relationship: Tg=1.95x−123. Accordingly, the diphenyl mole fraction in the synthesized copolymer is 5.6%.

Changes in the microstructure were evaluated by SEM with representative images shown in FIGS. 6A, 6B, 7A, and 7B. Interestingly, the sample exposed to the highest radiation dose showed a much rougher surface than corresponding images of the pristine material. Much more of the filler seems to be exposed on the surface of the highly irradiated samples. This is in agreement with the MCNP dose profiles, which showed the outer edges and surfaces to absorb much larger dose than the internal regions of the samples, due to thermal neutron absorption on the outer surfaces. TGA results indicated that mass losses occur at temperatures as low as 150° C., which is the in-situ temperature of samples irradiated to 122 MJ. Thus, heating is likely to promote evaporation of low-molecular weight compounds more efficiently on the surface than in the bulk of the sample. Furthermore, when the siloxane-based foams were exposed to similar gamma doses as the ones supplied by the nuclear reactor, no systematic changes in the microstructure of the foam could unambiguously be attributed to radiation exposure. Thus, it is possible that changes on the surface of the boron-composite are more likely due to the higher LET radiation produced by alpha particles than radiation produced by gamma exposure.

Figure 8A:
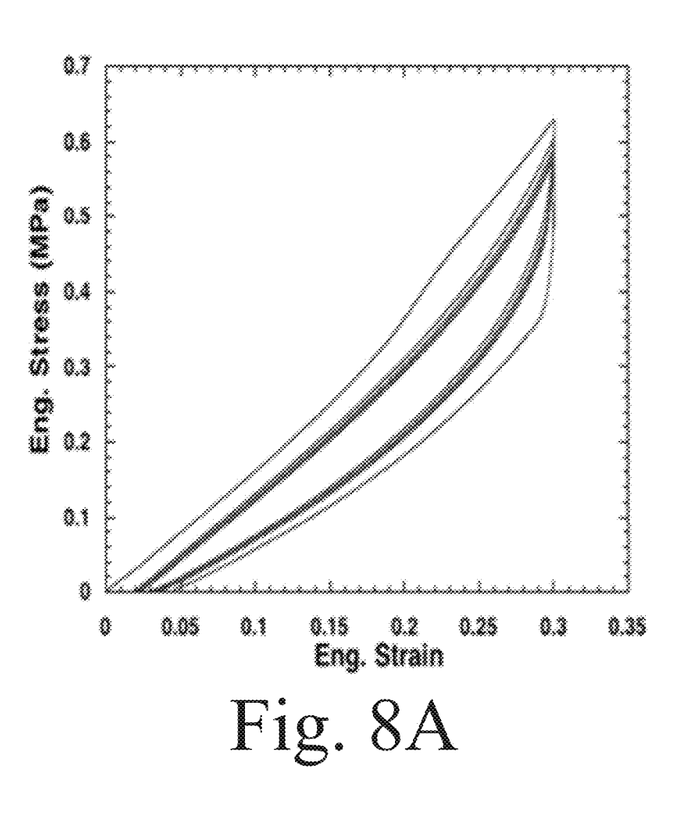
FIGS. 8A and 8B are graphs showing engineering stresses as a function of the engineering strains measured for the sample irradiated to 122 MJ (FIG. 8B) and the control sample (FIG. 8A).
Figure 8B:
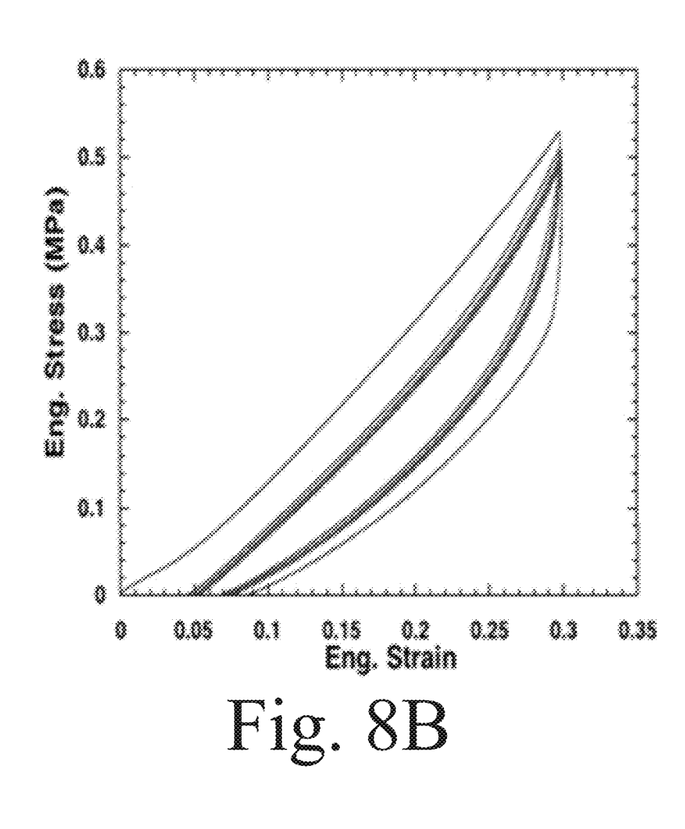

Mechanical tests were performed to probe changes in the material's response triggered by exposure to reactor radiation. Stress-strain tests were run at room temperature with results of cyclic loading as shown in FIGS. 8A and 8B. The elastic regime of the bulk material is well exceeded in the tests, as evidenced by the nonlinear shape of the stress-strain curve. It is interesting to note that a non-reversible hysteresis is observed after the first loading cycle, which corresponds to the Mullins effect. This stress softening of the material is detected for all samples and is likely due to rearrangement of the boron filler and neighboring polymer chains. In general, increasing in cross-link density would be accompanied by stiffening of the material or increasing in the Young's modulus. The results show no significant changes in the mechanical response of the irradiated composites when compared to control ones.

4. Conclusions

The present work investigated the tolerance of a newly formulated boron-filled PDMS-based composite to radiation generated by a nuclear reactor. The results demonstrated that the irradiated copolymer experienced no significant chemical changes as evidenced by FT-IR and NMR. A slight decreasing in solvent swelling indicated that radiation exposure induced formation of cross-links, which we inferred to be largely promoted by the high LET alpha radiation. No significant modifications to the thermal stability and mechanical properties of the irradiated boron-filled copolymers were observed. SEM experiments detected larger amounts of debris on the surface of the irradiated material than on the surface of control samples, which were likely due to the thermal evaporation of low-molecular weight species produced by in-situ temperature rising. Compressive loading tests showed no changes in the stiffness response to controlled strains with increasing reactor radiation exposure. Overall, this new polymeric material exhibited good nuclear survivability when exposed to very harsh environmental conditions. The successful synthesis of this highly-filled cross-linked polymer was largely attributable to the incorporation of carbon nanofibers. The well-dispersed nanofibers lead to an "interface dominated" material with improved mechanical properties even at very high filler loadings. Furthermore, good resistance to ionizing radiation and effective capture of thermal neutrons was accomplished by using a cross-linked copolymer with high concentrations of both aromatic groups in the polymer backbone and isotopically enriched B-10 in the polymer matrix.

Example II

After achieving high levels of elemental boron incorporation into the polysiloxane matrix (EXAMPLE I), other elemental materials such as copper, bismuth, and lead were incorporated into the matrix. The different elements shield different forms of radiation. These other elemental materials were also able to be incorporated at high loadings, while maintaining the elasticity desired in the final part and flow properties that allowed for simple molding. The different elemental materials have different densities, which enabled higher loadings to be achieved. For example, elemental bismuth was loaded to levels of about 90% by weight. These loading levels should similarly provide shielding capabilities.

The invention claimed is:

1. A composite material comprising polysiloxane polymer, carbon nanofibers, and greater than 60% by weight of elemental boron.

2. The composite material of claim 1, wherein the elemental boron comprises greater than about 50% by weight $^{10}$B isotope, with the total boron content of the composite material taken as 100% by weight.

3. The composite material of claim 1, wherein the material comprises about 90% or less by weight of the elemental boron.

4. The composite material of claim 1, wherein the polysiloxane polymer comprises aromatic groups in the polymer backbone.

5. The composite material of claim 4, wherein the polysiloxane polymer is polydimethylsiloxane (PDMS).

6. The composite material of claim 1, wherein the material comprises greater than about 10% by weight of the polysiloxane polymer.

7. The composite material of claim 1, wherein the material comprises about 0.1% to about 10% by weight of the carbon nanofibers.

8. The composite material of claim 1, wherein the polysiloxane polymer, the carbon nanofibers, and the elemental boron are uniformly dispersed within the composite material.

9. The composite material of claim 1, consisting essentially of the polysiloxane polymers, the elemental boron, and the carbon nanofibers.

10. The composite material of claim 1, consisting of the polysiloxane polymers, the elemental boron, and the carbon nanofibers.

11. A method of producing the composite material of claim 1, the method comprising:
    forming a mixture comprising the polysiloxane polymer, the carbon nanofibers, and the elemental boron; and
    curing the mixture to produce the composite material.

12. The method of claim 11, wherein the curing comprises heating the mixture to a temperature of at least about 105° C.

13. The method of claim 11, wherein the curing occurs in the presence of a platinum-based catalyst.

14. The method of claim 11, wherein forming the mixture comprises adding a solid powder form of the elemental boron to the polysiloxane polymer.

15. The method of claim 11, wherein forming the mixture comprises separately adding the carbon nanofibers and the elemental boron to the polysiloxane polymer.

16. The method of claim 11, wherein the polysiloxane polymer is synthesized by mixing vinyl terminated dimethylsiloxane copolymer with poly-methyl-hydrosiloxane.

17. The method of claim 16, wherein the vinyl terminated dimethylsiloxane copolymer and the poly-methyl-hydrosiloxane are mixed at a weight ratio of about 2:1 to about 99:1.

18. A composite material comprising:
greater than about 10% by weight of one or more polysiloxane polymers;
greater than 60% by weight or greater of elemental boron; and
from about 0.1% to about 10% by weight of carbon nanofibers,
wherein the composite material is substantially free of metal compounds and substantially free of metalloid compounds other than the one or more polysiloxane polymers.

19. The composite material of claim 18, consisting essentially of the polysiloxane polymers, the elemental boron, and the carbon nanofibers.

20. The composite material of claim 18, consisting of the polysiloxane polymers, the elemental boron, and the carbon nanofibers.

* * * * *